(12) United States Patent
Døssing et al.

(10) Patent No.: US 11,583,774 B2
(45) Date of Patent: Feb. 21, 2023

(54) TOY SYSTEM

(71) Applicant: LEGO A/S, Billund (DK)

(72) Inventors: Philip Kongsgaard Døssing, Billund (DK); Andrei Zavada, Billund (DK); Jesper Søderberg, Billund (DK)

(73) Assignee: LEGO A/S, Billund (DK)

( * ) Notice: Subject to any disclaimer, the term of this patent is extended or adjusted under 35 U.S.C. 154(b) by 0 days.

(21) Appl. No.: 17/257,105

(22) PCT Filed: Jun. 25, 2019

(86) PCT No.: PCT/EP2019/066886
§ 371 (c)(1),
(2) Date: Dec. 30, 2020

(87) PCT Pub. No.: WO2020/007668
PCT Pub. Date: Jan. 9, 2020

(65) Prior Publication Data
US 2021/0121782 A1  Apr. 29, 2021

(30) Foreign Application Priority Data

Jul. 6, 2018 (DK) .......................... PA 2018 70466

(51) Int. Cl.
*A63F 13/65* (2014.01)
*A63F 13/213* (2014.01)
*A63F 13/69* (2014.01)

(52) U.S. Cl.
CPC ............ *A63F 13/65* (2014.09); *A63F 13/213* (2014.09); *A63F 13/69* (2014.09); *A63F 2300/8082* (2013.01); *A63H 2200/00* (2013.01)

(58) Field of Classification Search
CPC ........ A63F 13/213; A63F 13/65; A63F 13/69; A63F 13/245; A63F 2300/8082; A63H 2200/00; A63H 33/086
See application file for complete search history.

(56) References Cited

U.S. PATENT DOCUMENTS

| 3,005,282 A | 10/1961 | Christiansen |
| D253,711 S | 12/1979 | Christiansen et al. |
| (Continued) | | |

FOREIGN PATENT DOCUMENTS

| EP | 2714222 A1 | 4/2014 |
| EP | 2749327 A1 | 7/2014 |
| (Continued) | | |

OTHER PUBLICATIONS

International Search Report issued in corresponding international application No. PCT/EP2019/066886, dated Sep. 5, 2019, 5 pages.
(Continued)

*Primary Examiner* — Seng H Lim
(74) *Attorney, Agent, or Firm* — Day Pitney LLP; Anthony A. Kassas

(57) ABSTRACT

The invention relates to a toy system including a plurality of toy construction elements, an image capturing device and a processor. The image capturing device is operable to capture one or more images of a toy construction model constructed from the toy construction elements. The processor is configured to: execute a digital game having computer executable code causing the processor to provide a digital play experience; receive an unlock code indicative of one or more virtual objects; unlock the one or more virtual objects for use in the digital play experience, each virtual object being associated with one of the respective toy construction elements or with a respective toy construction model; receive one or more images captured by said image capturing device; recognize one or more toy construction elements and/or toy construction models within the one or more images; provide a digital play experience involving said first unlocked virtual object.

17 Claims, 7 Drawing Sheets

(56) References Cited

U.S. PATENT DOCUMENTS

| | | | | |
|---|---|---|---|---|
| 6,259,815 | B1* | 7/2001 | Anderson | G06V 10/754 |
| | | | | 382/218 |
| 9,675,895 | B2* | 6/2017 | Judkins | A63H 3/28 |
| 10,213,692 | B2* | 2/2019 | Velic | G06K 9/6255 |
| 10,646,780 | B2* | 5/2020 | Laulund | A63F 13/77 |
| 2004/0177007 | A1* | 9/2004 | Van Luchene | G07F 17/3253 |
| | | | | 705/26.1 |
| 2005/0059483 | A1* | 3/2005 | Borge | A63F 13/65 |
| | | | | 463/29 |
| 2012/0190452 | A1* | 7/2012 | Weston | A63J 21/00 |
| | | | | 463/39 |
| 2012/0295703 | A1 | 11/2012 | Reiche et al. | |
| 2012/0304059 | A1* | 11/2012 | McCloskey | G06F 3/011 |
| | | | | 715/709 |
| 2014/0015813 | A1 | 1/2014 | Numaguchi et al. | |
| 2014/0256430 | A1 | 9/2014 | Matsumura | |
| 2014/0273717 | A1* | 9/2014 | Judkins | A63H 3/28 |
| | | | | 446/175 |
| 2014/0362228 | A1* | 12/2014 | McCloskey | H04N 5/33 |
| | | | | 348/164 |
| 2014/0378023 | A1 | 12/2014 | Muthyala et al. | |
| 2015/0123965 | A1* | 5/2015 | Molyneaux | G06T 19/20 |
| | | | | 345/419 |
| 2017/0189797 | A1 | 7/2017 | Muthyala et al. | |
| 2017/0225073 | A1* | 8/2017 | Laulund | A63F 13/65 |
| 2018/0264365 | A1* | 9/2018 | Soederberg | A63F 13/213 |
| 2019/0240581 | A1* | 8/2019 | Walker | A63F 13/213 |

FOREIGN PATENT DOCUMENTS

| | | | | |
|---|---|---|---|---|
| WO | 2011/017393 | A1 | 2/2011 | |
| WO | 2016/075081 | A1 | 5/2016 | |
| WO | WO-2017029279 | A2 * | 2/2017 | A63F 13/213 |
| WO | 2018007369 | A1 | 1/2018 | |
| WO | 2018/069269 | A1 | 4/2018 | |

OTHER PUBLICATIONS

Danish Search Report issued in corresponding Danish patent application No. PA 2018704666, dated Jan. 14, 2019, 4 pages.

EPO Communication in Application No. 19 734 060.7-1210, dated Nov. 7, 2022, 4 pages.

* cited by examiner

TOY SYSTEM

CROSS-REFERENCE TO RELATED APPLICATIONS

This application is a U.S. National Stage of International Application No. PCT/EP2019/066886, filed on 25 Jun. 2019 and published on 9 Jan. 2020, as WO 2020/007668 A1, which claims the benefit of priority to Danish Patent Application No. PA 2018 70466, filed on 6 Jul. 2018. The content of each of the above referenced patent applications is incorporated herein by reference in its entirety for any purpose whatsoever.

The present invention relates to the application of computer vision technology for toys-to-life applications and, more particularly, to a toy system employing such technology.

BACKGROUND OF THE INVENTION

Different attempts of integrating physical objects into virtual game play have been made. However, it remains desirable to provide ways of linking the physical world and a virtual game play which may stimulate the interactive involvement of the user and provide entertaining game play. Therefore there is a need for a new approach to interactive game play.

Most toy-enhanced computer games or so-called toys-to-life systems currently involve systems wherein toys must have a physical component configured to communicate with a special reader via some form of wireless communication like RFID, NFC etc. Examples of such systems are disclosed in e.g. US 2012/0295703, EP 2749327 and US 2014/256430. It would be generally desirable to provide toy systems that do not require the toy to comprise elements that are capable of communicating with a reader device so as to be able to identify a toy element, and to create its virtual digital representation and associate it with additional digital data.

WO 2011/017393 describes a system that uses computer vision to detect a toy construction model on a special background. In this prior art system, an assembled model is detected on a special background plate with a specific pattern printed on it.

EP 2 714 222 describes a toy construction system for augmented reality.

WO 2018/069269 describes a toy system including scannable tiles including visible, scannable codes. The codes represent in-game powers.

In view of this prior art it remains desirable to provide improved toy systems.

SUMMARY

In accordance with one aspect, disclosed herein are embodiments of a toy system. The toy system comprises: a plurality of toy construction elements, an image capturing device and a processor. The image capturing device is operable to capture one or more images of a toy construction model constructed from the toy construction elements. The processor is configured to:
  execute a digital game, the digital game comprising computer executable code configured to cause the processor to provide a digital play experience;
  receive an unlock code indicative of one or more virtual objects;
  responsive to receiving the unlock code, unlock the one or more virtual objects associated with said received unlock code for use in the digital play experience, each virtual object being associated with a respective one of said toy construction elements or with a respective toy construction model constructed from the toy construction elements;
  receive one or more images captured by said image capturing device;
  recognise one or more toy construction elements and/or toy construction models within the one or more images;
  responsive to recognising a first toy construction element or a first toy construction model associated with a first one of the unlocked virtual objects, provide a digital play experience involving said first unlocked virtual object.

Hence, the toy system allows the user to interact with the digital game by presenting one or more toy construction elements and/or toy construction models to the toy system such that the image capturing device captures one or more images of the one or more toy construction elements and/or toy construction models and the processor recognises at least a first toy construction element or a first toy construction model. If a first virtual object associated with the recognized first toy construction element or first toy construction model has previously been unlocked by means of a corresponding unlock code, the toy system provides a play experience involving the first virtual object associated with the recognized first toy construction element or first toy construction model.

Hence, the toy construction elements themselves do not need to be provided with recognisable unlock codes, thus allowing the user to use conventional toy construction elements to construct the toy construction model without requiring toy construction elements that are specifically adapted for the toy system. Nevertheless, the toy system provides an authentication mechanism that only provides access to the virtual objects subject to proper authentication by means of an unlock code. The processor may be configured to determine whether the received unlock code is an authentic unlock code.

Moreover, as embodiments of the process only need to recognize toy construction models that are associated with already unlocked virtual objects, the recognition task is simplified, since the number of different toy construction models to be recognized and distinguished from each other is limited to a set of known toy construction models.

The unlock code may have various forms, e.g. a barcode, QR code or other visually recognisable code. In other embodiments, the unlock code may be provided as an RFID tag or other electronic tag that can be read by a data processing system. Yet alternatively, the unlock code may be provided as a code to be manually entered by a user, e.g. as a sequence of alphanumeric symbols or in another suitable manner. In some embodiments, the unlock code may be provided as a combination of two or more of the above and/or in a different manner.

The unlock code may be provided as a physical item, e.g. a token or card on which a machine-readable and/or human-readable code is printed or into which an electronic tag is incorporated. The physical item may be a toy constriction element that includes coupling members for attaching the physical item to other toy construction elements of the set. Alternatively the physical item may be a physical item different from a toy construction element of the toy construction elements, i.e. without coupling members compatible with the toy construction system. The unlock code may also be provided as a part of the wrapping of a toy construction set, e.g. printed on the inside of a container, or otherwise obstructed from access prior to opening the wrapping.

The unlock code may be a unique code. The unlock code may be a one-time code (or otherwise limited use code), i.e. the processor may be configured to determine whether the received unlock code has previously been used and unlock the virtual object only, if the code has not previously been used. Accordingly, unlocking the virtual object may comprise marking the unlock code as used/expired.

The determination as to whether the unlock code has previously been used may be done in a variety of ways. For example, when the unlock code is provided as an electronic tag, the tag may include a rewritable memory and the processor may be configured to delete the unlock code from the tag or otherwise mark the unlock code as used/expired. Alternatively, the toy system may include a central repository of authentic unlock codes, e.g. maintained by a server computer. The processor may be communicatively connectable to the repository, e.g. via a suitable communications network such as the internet. Responsive to receipt of an unlock code, the processor may request authentication of the received unlock code by the repository. The repository may respond to the request with an indication as to whether the unlock code is authentic and/or whether the unlock code has already been used. The repository may also communicate to the processor which one or more virtual objects are associated with the unlock code. Upon unlocking the corresponding virtual objects, the unlock code may be marked as used in the repository (e.g. responsive to the initial request or responsive to a subsequent indication by the processor that the corresponding virtual object has been successfully unlocked).

Unlocking the virtual object may comprise unlocking the virtual object in an instance of the digital game, e.g. on a particular data processing device and/or for a given user. To this end, the unlocked virtual object may be associated with a user ID which may be stored locally on a processing device and/or in a central user repository. In some embodiments, the receipt of the unlock code may be performed as part of the digital game, in particular while the digital game is being executed, e.g. as part of the digital play experience. In some embodiments, the processor may receive the unlock code prior to providing the digital play experience, e.g. during an initial part of the digital game or even prior to executing the digital game, e.g. under control of a computer program different from the digital game.

In embodiments where the unlock code is provided as an electronic tag, such as an RFID tag, the toy system comprises a suitable electronic tag reader, e.g. an RFID reader. In embodiments where the unlock code is provided as a visually detectable code, the toy system comprises a suitable visual tag reader, e.g. a camera or other image capture device. In particular, the same image capture device may be used for reading the unlock code and for recognizing the toy construction elements and/or models. It will be appreciated that these two operations may typically be performed in separate steps and based on different captured images.

Many types of digital play experiences, in particular digital games, can be enhanced by the unlocking and recognition process described herein, including, but not limited to, nurture-games, battle type games (player vs. player or player vs. computer), racing games, and role playing action/ resource games, virtual construction games, massive multi-player online games, strategy games, augmented reality games, games on mobile devices, cogames allowing users to collect digital items, etc. In some embodiments the digital game comprises computer executable code configured to cause the processor to control at least one virtual object. Examples of virtual objects include virtual characters, such as a virtual player character that is controlled by the toy system in direct response to user inputs, or a non-player character that is controlled by the toy system based on the rules of the game. Other examples of virtual objects include inanimate objects, such as accessories that can be used by virtual characters, e.g. weapons, vehicles, clothing, armour, food, in-game currency or other types of in-game resources, etc. Accordingly, the digital game may be of the type where the user controls a virtual object such as a virtual character in a virtual game environment. Alternatively or additionally, the digital game may provide a different form of play experience, e.g. a digital nurturing game, a digital game where the user may construct digital worlds or other structures from multiple virtual objects, a strategic game, a play experience where the user collects virtual objects, a social platform, and/or the like.

Generally, the virtual objects may be virtual characters or other animate or inanimate virtual items, such a vehicles, houses, structures, accessories such as weapons, clothing, jewelry, tools, etc. to be used by virtual characters, etc. Generally, a virtual object may represent any type of game asset.

An unlock code may represent a single virtual object or multiple virtual objects. For example, a toy construction set may comprise (e.g. provided in a box or other container) a plurality of toy construction elements from which one or more toy construction models can be constructed. The toy construction set may further comprise one or more unlock codes, e.g. accommodated inside the container. In some embodiments, a single unlock code may be provided which unlocks multiple virtual objects, e.g. associated with respective toy construction elements of the set and/or with respective toy construction models that can be constructed from the toy construction elements included in the toy construction set. In other embodiments, the toy construction set may comprise multiple unlock codes each for unlocking respective ones of the toy construction elements and/or models.

The recognition of the toy construction elements and/or models may be performed using known methods from the field of computer vision, e.g. as described in WO 2016/075081.

In some embodiments, unlocking a virtual object may not automatically assign or activate the virtual object but merely make the virtual object available to the user of the digital game, e.g. such that the user can subsequently select, assign or activate the virtual object. To this end, the digital game may create a representation of the virtual object and/or add the virtual object to a collection of available virtual objects.

The unlocked first virtual object has a visual appearance that may resemble the first toy construction element or model with which the first virtual object is associated. The visual appearance may be predetermined, i.e. the first virtual object may resemble a predetermined toy construction model or predetermined toy construction element.

In alternative embodiments, responsive to receiving the unlock code, unlocking the one or more virtual objects may comprise associating a visual appearance to the unlocked virtual object. To this end, in some embodiments, the system may allow the user to capture one or more images of a toy construction model whose visual appearance is to be associated with the unlocked virtual object. Hence, the user may customise the visual appearance of the unlocked virtual object. In particular, the processor may recognise one of a set of available toy construction models and apply the corresponding visual appearance to the unlocked virtual object.

For the purpose of the present description, a toy construction model is a coherent structure constructed from two or more toy construction elements. A toy construction element is a single coherent element that cannot be disassembled in a nondestructive manner into smaller toy construction elements of the toy construction system. A toy construction model or toy construction element may be part of a larger structure, e.g. a larger toy construction model, while still being individually recognizable. A toy construction model or element recognized or recognizable by the processor in a captured image refers to a toy construction model or element that is individually recognized or recognizable, regardless as to whether the toy construction model or element is captured in the image on its own or as part of a larger toy construction model. For example, the processor may be configured to recognize partial toy construction models at different stages of construction. So as the user builds e.g. a wall that will be part of a bigger building the processor may be operable to recognize the wall as a partial toy construction model and the complete building as the completed toy construction model.

In any event, the received one or more images within which the processor recognises one or more toy construction elements and/or toy construction models may depict a composite toy construction model constructed from at least a first toy construction model and a second toy construction model or a composite toy construction model constructed from a first toy construction model and an additional first toy construction element. The first and second toy construction models may be interconnected with each other directly or indirectly—via further toy construction elements—so as to form a coherent composite toy construction model. Similarly, the first toy construction model and the additional first toy construction element may be interconnected with each other directly or indirectly—via further toy construction elements—so as to form a coherent composite toy construction model. A composite toy construction model is thus formed as a coherent structure formed from two or more interconnected individual toy construction models and/or from one or individual toy construction models interconnected with one or more additional toy construction elements. Here the terms individual toy construction models and additional toy construction elements refer to toy construction models or elements that are individually recognisable by the processor of the toy system.

For example, the composite toy construction model may comprise a vehicle constructed from a plurality of toy construction elements and a figurine riding or driving the vehicle where the figurine itself is constructed from multiple toy construction elements. In another example, the composite toy construction model comprises a figurine constructed from multiple toy construction elements and the figurine may carry a weapon which may be formed as a single toy construction element or it may itself be constructed from multiple toy construction elements.

Recognising one or more toy construction elements and/or toy construction models within the one or more images may thus comprise recognising each of the first and second toy construction models included in the composite toy construction model and/or recognising each of the first toy construction model and the first toy construction element included in the composite toy construction model.

Generally, in some embodiments, the process may be configured to recognized multiple toy construction models in the same image, e.g. separate toy construction models placed next to each other or interconnected toy construction models forming a composite toy construction model.

The processor may thus be configured, responsive to recognising the first and second toy construction models, where the first toy construction model is associated with a first unlocked virtual object and the second toy construction model is associated with a second unlocked virtual object, to provide a digital play experience involving said first and second unlocked virtual objects, in particular such that the first and second virtual objects interact with each other. For example, the play experience may involve a composite virtual object formed as a combination of the first and second virtual objects, e.g. as a vehicle with a driver/rider.

Similarly, responsive to recognising the first toy construction model and the first additional toy construction element, where the first toy construction model is associated with a first unlocked virtual object and the first additional toy construction element is associated with a second unlocked virtual object, the processor may be configured to provide a digital play experience involving said first and second unlocked virtual objects, in particular such that the first and second virtual objects interact with each other. For example, the play experience may involve a composite virtual object formed as a combination of the first and second virtual objects, e.g. as a virtual character carrying a weapon or other accessory.

Hence, the user may select one or several, e.g. a combination of the unlocked virtual objects by construction and capturing images of corresponding toy construction models and/or by capturing images of corresponding toy construction elements. In some embodiments, this selection may be performed a single time while, in other embodiments, the toy system may allow a user to repeatedly select different virtual objects and/or different combination of virtual objects to be included in the digital play experience.

In some embodiments, the multiple, individually recognizable toy construction models and/or additional toy construction elements forming a composite toy construction model may be interconnected in different spatial configurations relative to each other. For example a figurine may be positioned in or on a vehicle in different riding positions. The processor may be configured to not only recognise the individual toy construction models and/or elements, but also their spatial configuration. The processor may then modify the provided play experience responsive to the recognised spatial configuration. For example, a weapon carried by a figurine may provide different in-game attributes, e.g. powers, depending on how the weapon is carried by the figurine, e.g. whether it is carried in the left or right hand.

The digital play experience involving the selected virtual object or objects may have a variety of forms. For example, the digital play experience involving the selected virtual object or objects may be a digital game where the user controls the thus selected virtual object or combination of objects. In other embodiments, the digital play experience may allow a user to arrange the select virtual object or objects within a digital environment, e.g. a digital scene, or to modify the selected virtual object(s), e.g. to decorate the virtual object(s) or to use the selected virtual object(s) as part of a digital construction environment, to trade selected virtual objects with other users of an online play experience or to otherwise interact with virtual object(s) selected by other users.

Generally, in some embodiments, each of the toy construction elements comprises one or more coupling members configured for detachably attaching the toy construction element to one or more other toy construction elements of the toy construction system. To this end the toy construction elements may comprise mating coupling members configured for mechanical and detachable interconnection with the coupling members of other toy construction elements, e.g. in frictional and/or interlocking engagement. In some embodiments, the coupling members are compatible with the toy construction system.

In some embodiments, the image capturing device is a camera, such as a digital camera, e.g. a conventional digital camera. The image capturing device may be a built-in camera of a portable processing device. Generally, examples of portable processing devices include a tablet computer, a laptop computer, a smartphone or other mobile device. In some embodiments, the image capturing device comprises a 3D capturing device such as a 3D sensitive camera, e.g. a depth sensitive camera combining high resolution image information with depth information. An example of a depth sensitive camera is the Intel® RealSense™ 3D camera, such as the model F200 available in a developer kit from Intel Corporation. The image capturing device may be operable to capture one or more still images. In some embodiments the digital camera is a video camera configured to capture a video stream. Accordingly receiving one or more images captured by said image capturing device may include receiving one or more still images and/or receiving a video stream.

The processor is adapted to detect the toy construction elements and/or toy construction models in the captured image(s) and to recognise the toy construction models and/or elements. To this end, the toy system may comprise a library of known toy construction models and/or elements, each associated with information about the corresponding virtual object and whether the virtual object has already been unlocked and/or how the toy construction element may be combined with other toy construction models or elements so as to form a composite toy construction model. The information about the corresponding virtual object may e.g. include one or more of the following: a virtual object identifier, information about a visual appearance of the virtual object, one or more virtual characteristics of the virtual object, a progression level in the digital play experience, and/or the like.

While the toy construction elements themselves do not need to be provided with recognisable codes or markers, in some embodiments, this may be useful, anyway. Accordingly, in some embodiments, one or more of the plurality of toy construction elements may include a visually recognizable object code identifying a toy construction element or a toy construction model. In particular, in some embodiments, the plurality of toy construction elements of the system may include one or more marker toy construction elements which may be toy construction elements having a visual appearance representative of an object code or of a part thereof. For example, the toy construction system may comprise two or more marker construction elements that, when interconnected with each other, together have a visual appearance representative of an object code. Accordingly the object code may identify an individual toy construction element or a toy construction model including one or more marker construction elements that together represent the object code. The object code may be represented in the form of a barcode, a QR code or an otherwise machine-readable code. Alternatively, the object code may otherwise be encoded in the visual appearance of the marker toy construction element, e.g. invisibly embedded into a graphical decoration, an insignia, a color combination and/or the like. The object code may be different from the unlock code. In some embodiments, the object code is a unique object code, uniquely identifying a particular toy construction element or model, e.g. a serial number or other type of unique code. In other embodiments, the object code is a non-unique object code, i.e. such that there exists two toy construction elements or models that carry the same object code. Use of non-unique object codes may allow the visual markers/features representing the object code to be smaller and/or less complex, as the information content required to be represented by the markers/features may be kept small. This allows the codes to be applied to small objects and/or to be applied in a manner that does not interfere too much with the desired aesthetic appearance of the object. For example, the object code to be assigned to a particular toy construction element or model may be selected randomly, sequentially or otherwise from a pool of codes. The pool of codes may or may not be sufficiently larger than the number of toy construction elements or models that are assigned an object code, sufficiently larger for the code to be considered unique. For example, the pool of codes may be comparable in size or even smaller than the number of toy construction elements or models that are assigned an object code, but preferably large enough so that the risk of acquiring two toy construction elements or models having the same object code is acceptably small.

The processor may be configured to detect the object code within the one or more images. The process may then adapt the digital play experience responsive to the detected object code. To this end, the object code may be used in a variety of ways.

In some embodiments, the processor may be configured, responsive to receiving the unlock code, to unlock a virtual object where the digital game is configured to provide a plurality of instances of the virtual object. In particular, the plurality of instances of a virtual object may share one or more common characteristics, such as a common visual appearance and/or one or more common virtual attributes indicative of a common virtual behaviour of the virtual object. In particular, the plurality of instances may be recognizable by the user as being instances of the same virtual object. Nevertheless, the plurality of instances may differ from one another by one or more specific characteristics, e.g. variations of the visual appearance, such as different clothing, accessories, etc. and/or by one or more specific virtual attributes, such as a virtual health level, power level and/or the like. For example, a virtual object may evolve during the course of the digital play experience, e.g. responsive to game events, user interaction etc. Examples of such evolution may include changes in one or more virtual object attributes such as virtual health values, virtual capabilities and/or the like. Providing a plurality of instances of the virtual object may include providing instances each having respective attribute values of one or more virtual object attributes. Alternatively or additionally, the digital game may allow a user to customize a virtual object, e.g. by selecting accessories, clothing, etc. Accordingly, the digital game may maintain a plurality of differently customized instance of a virtual object.

The first unlocked virtual object may be associated with a particular recognizable type of toy construction element or toy construction model. Each instance of at least a first virtual object may further be associated with a particular object code in combination with the particular recognizable type of toy construction element or toy construction model.

Hence, in some embodiments, recognizing the first toy construction element or the first toy construction model associated with the first unlocked virtual object may comprise:

recognizing the first toy construction element as a toy construction element of a first type of toy construction elements or recognizing the first toy construction model as a toy construction model of a first type of toy construction models, and detecting a first object code associated with the recognized first toy construction element or the recognized first toy construction model.

The processor may then be configured, responsive to recognizing the first toy construction element or the first toy construction model, to provide a digital play experience involving a first instance of said first unlocked virtual object, the first virtual object being associated with the first type of toy construction elements or the first type of toy construction models, and the first instance of said virtual object being further associated with the first object code.

In some embodiments, the processor is configured, responsive to recognising the first toy construction element or the first toy construction model associated with a first one of the unlocked virtual objects, to store the detected first object code associated with the first unlocked virtual object. In particular, in some embodiments, the processor may be configured to determine whether an object code has previously been stored associated with the first unlocked virtual object and to associate the detected first object code with the first unlocked virtual object only if no object code has previously been associated with the first unlocked virtual object, e.g. only the first time the first toy construction element or the first toy construction model associated with the first unlocked virtual object has been recognized after the first virtual object has been unlocked.

The processor may further be configured to compare the detected first object code with a previously stored object code associated with the first unlocked virtual object, and to provide the digital play experience involving said first unlocked virtual object only if the detected first object code corresponds, in particular is equal, to the previously stored object code associated with the first unlocked virtual object.

Here and in the following, the term processor is intended to comprise any circuit and/or device suitably adapted to perform the functions described herein. In particular, the term processor comprises a general- or special-purpose programmable data processing unit, e.g. a microprocessor, such as a central processing unit (CPU) of a computer or of another data processing system, a digital signal processor (DSP), an application specific integrated circuits (ASIC), a programmable logic arrays (PLA), a field programmable gate array (FPGA), a special purpose electronic circuit, etc., or a combination thereof. The processor may be integrated into a portable processing device, e.g. where the portable processing device further comprises the image capturing device and a display. It will be appreciated, however, that the toy system may also be implemented as a client-server or a similar distributed system, where the image capturing and other user interaction is performed by a client device, while the image processing and recognition tasks and/or the unlock code verification tasks may be performed by a remote host system in communication with the client device. According to some embodiments, an image capturing device or a mobile device with an image capturing device may communicate with a computer, e.g. by wireless communication with a computing device comprising a processor, data storage and a display.

In some embodiments, the image capturing device communicates with a display that shows in real-time a scene as seen by the image capturing device so as to facilitate targeting the desired toy construction model(s) whose image is to be captured.

The present disclosure relates to different aspects including the toy system described above and in the following, corresponding apparatus, systems, methods, and/or products, each yielding one or more of the benefits and advantages described in connection with one or more of the other aspects, and each having one or more embodiments corresponding to the embodiments described in connection with one or more of the other aspects and/or disclosed in the appended claims.

In particular, according to one aspect, disclosed herein is a method, implemented by a processor, of operating a toy system, the toy system comprising a plurality of toy construction elements, an image capturing device and the processor; the image capturing device being operable to capture one or more images of one or more toy construction models constructed from the toy construction elements and placed within a field of view of the image capturing device; wherein the method comprises:

executing a digital game, the digital game comprising computer executable code configured to cause the processor to provide a digital play experience;

receiving an unlock code indicative of one or more virtual objects;

responsive to receiving the unlock code, unlocking the one or more virtual objects associated with said received unlock code for use in the digital play experience, each virtual object being associated with a respective one of said toy construction elements or with a respective toy construction model constructed from the toy construction elements;

receiving one or more images captured by said image capturing device;

recognising one or more toy construction elements and/or toy construction models within the one or more images;

responsive to recognising a first toy construction element or a first toy construction model associated with a first one of the unlocked virtual objects, providing a digital play experience involving said first unlocked virtual object.

According to yet another aspect, disclosed herein is a processing device, e.g. a portable processing device, configured to perform one or more of the methods disclosed herein. The processing device may comprise a suitably programmed computer such as a portable computer, a tablet computer, a smartphone, a PDA or another programmable computing device, e.g. a device having a graphical user-interface and, optionally, a camera or other image capturing device.

Generally, the digital game may be implemented as a computer program, e.g. as a computer readable medium having stored thereon the computer program. Accordingly, according to yet another aspect, disclosed herein is a computer program which may be encoded on a computer readable medium, such as a disk drive or other memory device. The computer program comprises program code adapted to cause, when executed by a processing device, the processing device to perform one or more of the methods described herein. The computer program may be embodied as a computer-readable medium, such as a CD-ROM, DVD, optical disc, memory card, flash memory, magnetic storage device, floppy disk, hard disk, etc. having stored thereon the computer program. In other embodiments, a computer program product may be provided as a downloadable software package, e.g. on a web server for download over the internet or other computer or communication network, or as an application for download to a mobile device from an App store. According to one aspect, a computer-readable medium has stored thereon instructions which, when executed by one or more processing units, cause the processing unit to perform an embodiment of the process described herein.

The present disclosure further relates to a toy construction set comprising a plurality of toy construction elements, one or more unlock codes, and instructions to obtain a computer program code that causes a processing device to carry out the steps of an embodiment of one or more of the methods described herein, when the computer program code is executed by the processing device. For example, the instructions may be provided in the form of an internet address, a reference to an App store, or the like. The instructions may be provided in machine readable form, e.g. as a QR code or the like. The toy construction set may even comprise a computer-readable medium having stored thereon the computer program code. Such a toy construction set may further comprise a camera or other image capturing device connectable to a data processing system.

Additional features and advantages will be made apparent from the following detailed description of embodiments that proceeds with reference to the accompanying drawings.

BRIEF DESCRIPTION OF THE DRAWINGS

Preferred embodiments of the invention will be described in more detail in connection with the appended drawings, where FIGS. 1-3 schematically illustrate examples of toy construction sets of a toy system described herein.

DETAILED DESCRIPTION

Embodiments of the method and system disclosed herein may be used in connection with a variety of toy objects and, in particular with construction toys that use modular toy construction elements based on dimensional constants, constraints and matches, with various assembly systems like magnets, studs, notches, sleeves, with or without interlocking connection etc. Examples of these systems include but are not limited to the toy constructions system available under the tradename LEGO. For example, U.S. Pat. No. 3,005,282 and USD253711S disclose one such interlocking toy construction system and toy figures, respectively.

Figure 1:
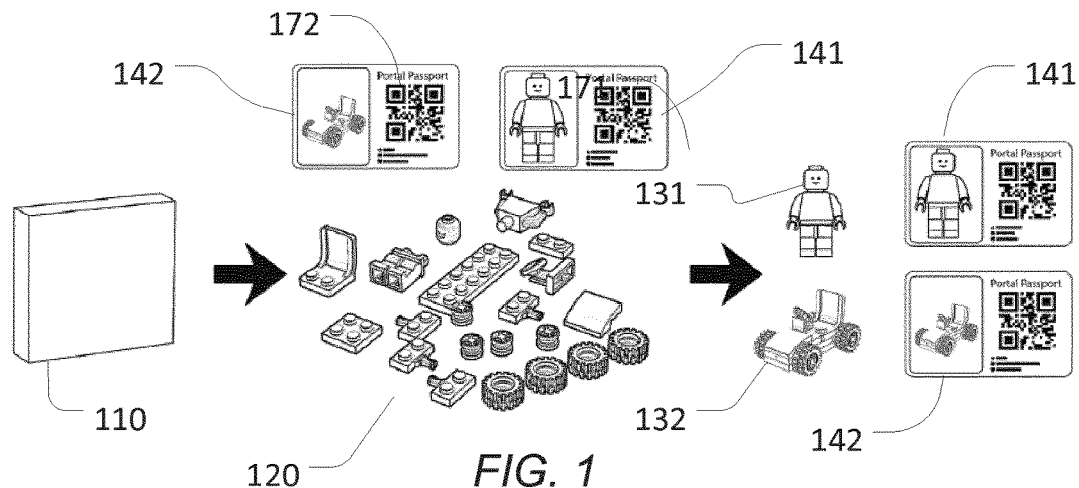

FIG. 1 schematically illustrates an example of a toy construction set of a toy system described herein. The toy construction set is obtained in a box 110 or other form of packaging. The box includes a plurality of conventional toy construction elements 120 from which one or more (two in the example of FIG. 1) toy construction models 131, 132 can be constructed. In the example of FIG. 1, a toy figurine 131 and a toy car 132 can be constructed from the toy construction elements of the set. The toy construction set further comprises two cards 141, 142, e.g. made from plastic or cardboard. Each card shows an image or other representation of one of the toy construction models and a machine-readable code 171, 172, in this example a QR code, which represents an unlock code for a virtual object associated with the respective toy construction model, e.g. a virtual character and a virtual car, respectively. Alternatively, the unlock code(s) may be provided to the user in a different manner, e.g. by mail or sold separately. Hence, each unlock code is a unique code that comes with the product or is given to the user, in the form of a physical printed code or a digital code. The unlock code(s) when used (e.g. scanned or typed in) then unlocks the possibility of using computer vision to select the unlocked virtual object in/for a digital experience.

Figure 2:
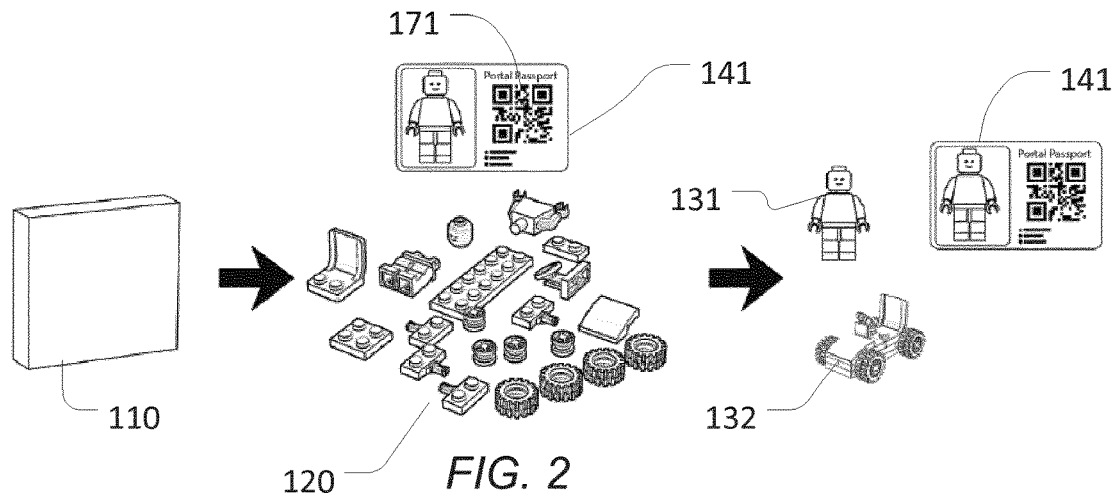
FIGS. 2-6 schematically illustrate examples of a use of an embodiment of toy system described herein.

FIG. 2 schematically illustrates another example of a toy construction set, similar to the set of FIG. 1 in that the toy construction set is obtained in a box 110 and that the box includes a plurality of conventional toy construction elements 120 from which one or more (two in the example of FIG. 2) toy construction models 131, 132 can be constructed. However, in this example, the toy construction set only includes a single card 141 with an unlock code 171 associated with one of the toy construction models (in this example figurine 131) that can be constructed from the toy construction elements of the set. It will be appreciated that, in other embodiments, the set may include one or more unlock codes for unlocking one or more virtual objects associated with any subset of toy construction models constructable from the toy construction elements of the set.

Figure 3:
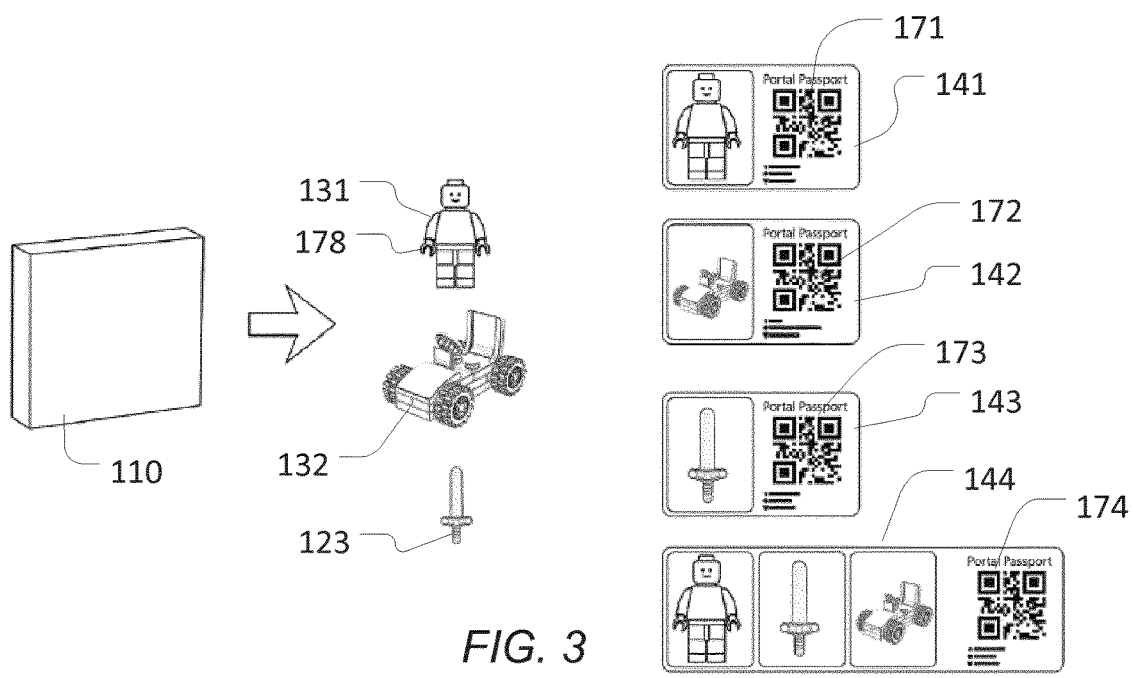

FIG. 3 schematically illustrates another example of a toy construction set, similar to the set of FIG. 1. However, in this example, the toy construction set includes toy construction elements (not explicitly shown) for constructing the figurine 131 and the car 132 and an additional toy construction element 123, in this example a sword 123 that can be carried by the figurine 131, i.e. that can be attached to a hand 178 of the figurine 131.

The set may include three cards 141-143 with respective unlock codes 171-173, one code 171 associated with the figurine 131, another code 172 associated with the car 132 and yet another code 173 associated with the sword 123. In an alternative embodiment, the set may include a card 144 with a single unlock 174 code for unlocking multiple virtual objects associated with the figurine, the car and the sword, respectively. Again, it will be appreciated that, instead of providing a card 144, the single unlock code may be provided in a different manner.

Figure 4:
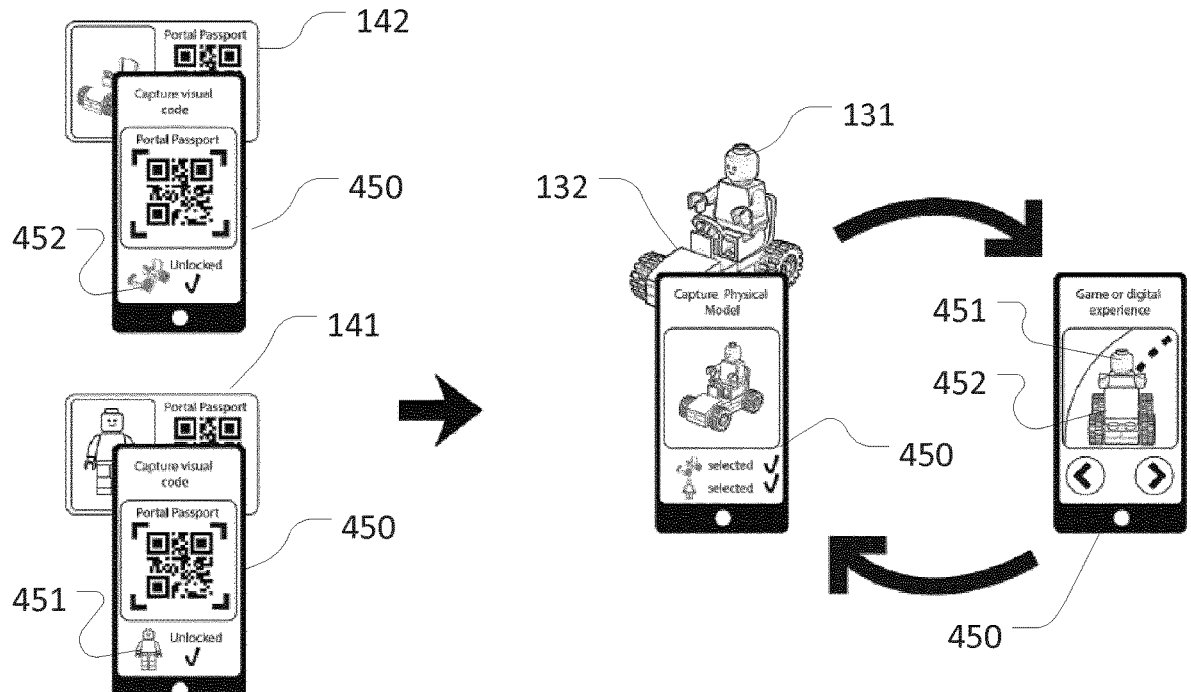

FIG. 4 illustrates an example of a use of the toy system described herein, e.g. using the toy construction set of any of FIGS. 1-3 and a suitably programmed portable device 450, e.g. a tablet or smartphone executing an app that implements a digital game of the toy system. As in the previous examples, the toy construction set includes toy construction elements (not explicitly shown) for constructing a figurine 131 and a car 132.

Initially, the processing device reads the one or more unlock codes included in the toy construction set, e.g. from respective cards 141 and 142 as described above. This causes the corresponding virtual objects 451, 452 (in this example a virtual car 452 and a virtual character 451) to be unlocked. The user may then capture an image of the toy figurine 131 positioned in the driver's seat of the toy car 132. The processing device 450 recognises the figurine and the car making up the thus constructed composite model causing the digital game to provide a play experience involving a virtual car 452 driven by a corresponding virtual character 451. After completion of the play experience, the user may capture another image of the same or of a different toy construction model and engage in the same or a different play experience involving the corresponding unlocked virtual objects.

Hence, while a virtual object may only need to be unlocked once it may, once unlocked, be available multiple times (e.g. a limited number or an unlimited number of times) for selection as a part of a play experience. The selection is performed by capturing an image of the corresponding physical toy construction element or model.

Figure 5:
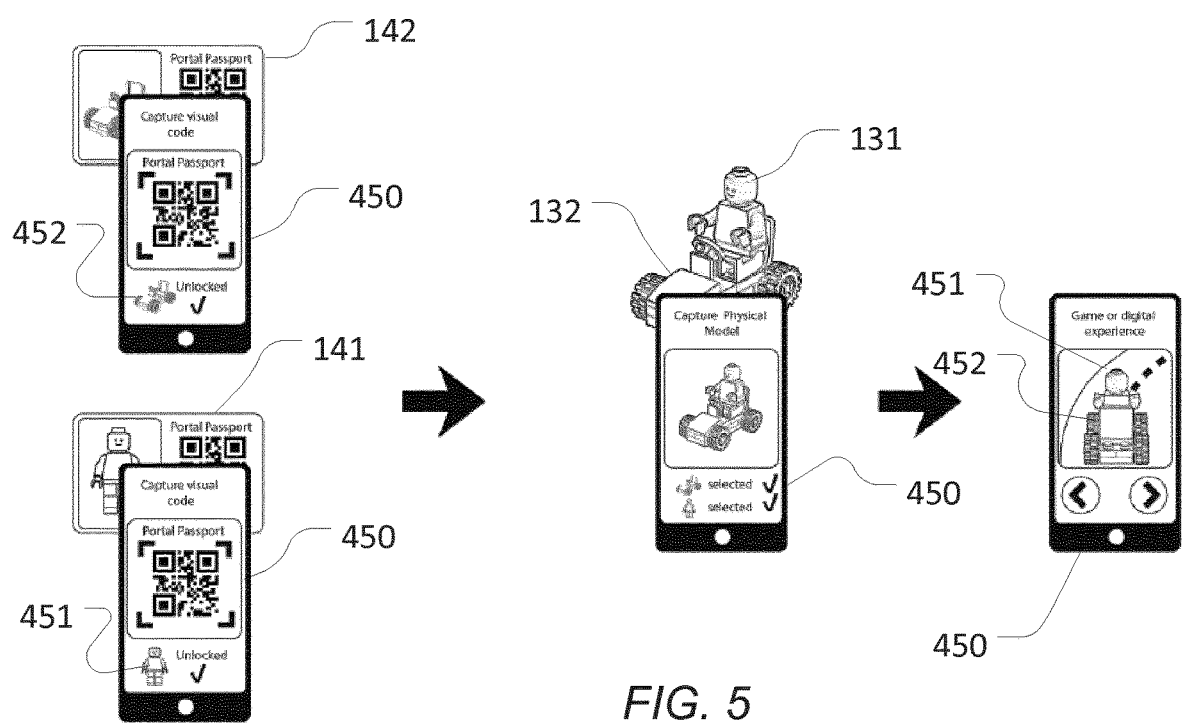

FIG. 5 illustrates an example of another use of the toy system described herein, e.g. using the toy construction set of any of FIGS. 1-3 and a suitably programmed portable device 450, e.g. a tablet or smartphone executing an app that implements a digital game of the toy system. The example of FIG. 5 is similar to the example of FIG. 4. However, while the use of FIG. 4 allows the virtual objects 451, 452 to repeatedly be selected, optionally in different combinations with other objects, the use of FIG. 5 only allows a single selection of an unlocked virtual object. Once a combination is selected, it is the thus selected combination that is used in the play experience.

Figure 6:
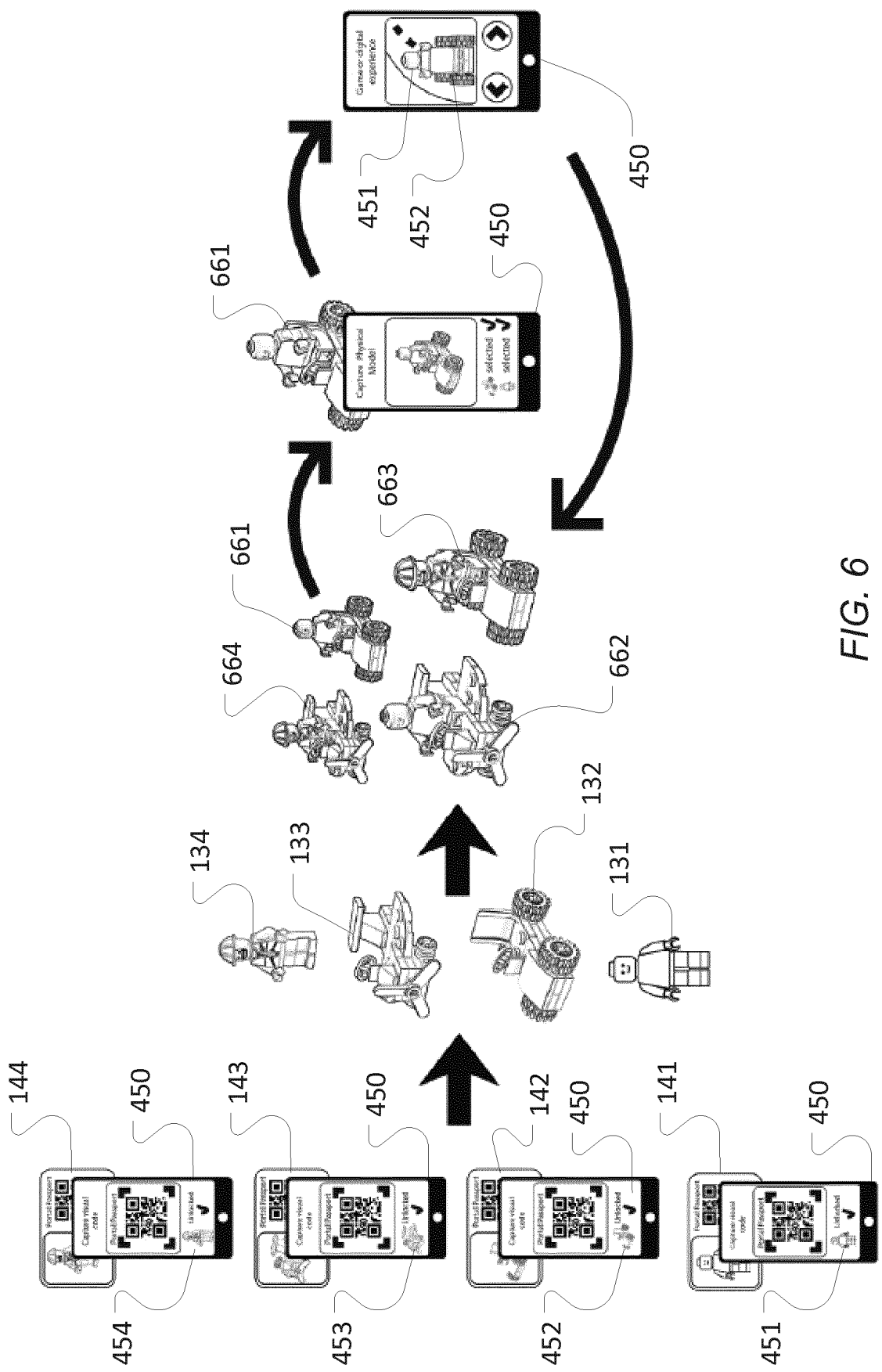

FIG. 6 illustrates an example of another use of the toy system described herein, e.g. using the toy construction set of any of FIGS. 1-3 and a suitably programmed portable device 450, e.g. a tablet or smartphone executing an app that implements a digital game of the toy system. The example of FIG. 6 is similar to the example of FIG. 4. In particular, the toy system of FIG. 6 comprises toy construction elements from which a number of toy construction models 131-134 can be constructed. The toy system further comprises four cards 141-144 with unlock codes for unlocking four virtual objects 451-454, each corresponding to one of the toy construction models 131-134.

In the example of FIG. 6 the user has unlocked four virtual objects 451-454 that can be combined in different ways in the digital game by capturing images of corresponding composite toy construction models 661-664 constructed from respective combinations of the individually recognizable toy construction models. In particular, composite toy construction model 661 is constructed from figurine 131 and car 132, composite toy construction model 662 is constructed from figurine 131 and car 133, composite toy construction model 663 is constructed from figurine 134 and car 132, and composite toy construction model 664 is constructed from figurine 134 and car 133.

Figure 7:
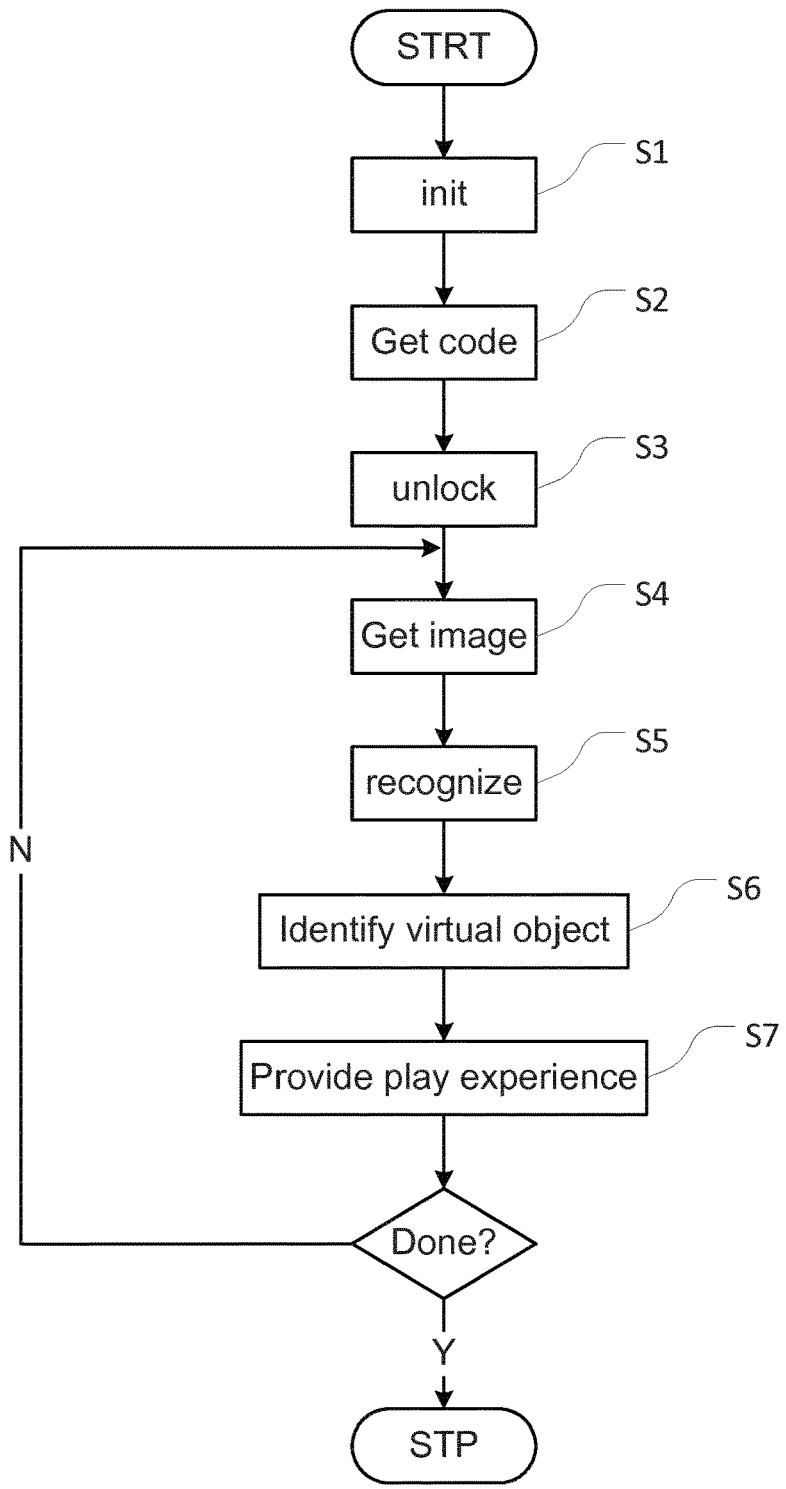
FIG. 7 shows a flow diagram of an example of a process as described herein.

FIG. 7 shows a flow diagram of an example of a computer-implemented process for controlling a digital game of a toy system, e.g. of any of the toy systems described in connection with FIGS. 1-6. In particular, the process may be executed by a processing device including a digital camera and a display, such as a mobile phone, a tablet computer or another personal computing device.

In initial step S1, the process initiates execution of a digital game, e.g. by executing a computer program stored on a processing device. The digital game provides functionality for acquiring unlock codes, capturing images of toy construction models, recognizing toy construction models in the captured images, and for providing a digital play experience involving one or more virtual objects.

In step S2, the process acquires an unlock code, e.g. by reading a QR code, reading an RFID tag, receiving a code manually entered by a user input, or in another suitable way.

In subsequent step S3, the process unlocks a virtual object associated with the received unlock code. For example, the digital game may have stored information about a plurality of virtual objects, each virtual object having associated with it a stored unlock code or a set of unlock codes. The process may thus compared the acquired unlock code with the stored unlock codes or codes so as to identify which virtual object to unlock. The process may then flag the virtual object as unlocked. In some embodiments, the process may be implemented by a distributed system, e.g. including a client device and a remote host system, e.g. as described in connection with FIG. 11 In such a system, the processing device may forward the acquired unlock code to the host system and the host system may respond with information about a virtual object to be unlocked In step S4, the process receives an image of a toy construction model. For example, the image may be an image captured by a digital camera of the device executing the process. The image may directly be forwarded from the camera to the recognition process. To this end, the process may instruct the user to capture an image of a toy construction model constructed by the user, where the toy construction model represents the unlocked virtual object. In some embodiments, the process may initially display or otherwise present building instructions instructing the user to construct a predetermined toy construction model. The process may receive a single captured image or a plurality of images, such as a video stream, e.g. a live video stream currently being captured by the camera.

In step S5, the process processes the received image in an attempt to recognize a known toy construction model in the received image. For example, the process may feed the captured image into a trained machine learning algorithm, e.g. a trained neural network, trained to recognize each of a plurality of target toy construction models. An example of a process for recognizing toy construction models is described in WO 2016/075081. However, it will be appreciated that other image processing and vision technology techniques may be used for recognizing toy construction models in the received image. It will further be appreciated that the recognition process may recognize the toy construction model as a whole or the process may recognize individual toy construction elements of the model, e.g. one or more marker toy construction elements comprising a visual marker indicative of the toy construction model.

If the process fails to recognize a known toy construction model, the process may repeat step S5 to receive a new image. Repeated failure to recognize a known toy construction model may cause the process to terminate or to proceed in another suitable manner, e.g. requesting the user to capture another image of another toy construction model.

When the process has recognized a known toy construction model in the received image, the process proceeds at step S6 where the process determines whether an unlocked virtual object is associated with the recognized toy construction model. To this end, the process may compare the recognized toy construction model with a list of known toy construction models, each known toy construction model having a respective virtual object associated with it. Moreover, each virtual object may have a locked/unlocked flag associated with it. Hence, only when the recognized toy construction model has a virtual model associated with it where the unlock flag is set, the process determines that an unlocked virtual object is associated with the recognized toy construction model.

When the process determines that an unlocked virtual object is associated with the recognized toy construction model, the process proceeds at step S7; otherwise, the process may terminate, inform the user that the corresponding virtual object needs to be unlocked, or proceed in another suitable manner.

At step S7, the process provides a digital play experience involving the virtual object that is associated with the recognized toy construction model. For example, the process may start a play experience with the identified virtual object, or the process may add the virtual object to an ongoing play experience.

After completion of the play experience, or responsive to a game event or a user input, the process may return to step S4 allowing the user to acquire an image of another toy construction model. Alternatively, the process may terminate.

It will be appreciated that various modifications to the above process may be implemented.

For example, the process may recognize parts of a toy construction model and determine whether unlocked virtual objects are associated with one or each of the recognized parts and provide a play experience involving a combination of these unlocked virtual objects, e.g. only if all recognized parts have an unlocked virtual object associated with it. Examples of such a process are described in connection with FIGS. 4-6. The recognized parts may be individual toy construction elements or toy construction models that are interconnected to form a combined model. Alternatively or additionally, the process may restrict use of the unlocked virtual objects, e.g. to a single use or a predetermined number of uses, to certain combinations with other objects, and/or the like.

Alternatively or additionally, steps S5 and S6 may be combined into a single operation. For example, the process may only recognize toy construction models as known toy construction models if they have an unlocked virtual object associated with it.

Yet alternatively or additionally, in step S5, the process may further detect an object code applied to a recognized toy construction model, e.g. by reading a QR code or another type of visually recognizable code from the captured image.

For example, during manufacturing of a toy construction element, a data processing system executing an encoder may convert a bit string or other object code into a visually recognizable code, such as a QR code, a graphic decoration, and/or the like. The encoded visually recognizable code may then be printed on the toy construction element, e.g. on a torso of a figurine as illustrated in FIGS. 8A-C.

During step S5, a decoding function may analyse an image of a toy construction model and extract the object code that was embedded by the encoder. The decoding function may be based on a QR code reading function, a neural network trained to convert encoded images into their object code counterparts, or the like. Error correction codes can be added to the object code so that a number of erroneous output bits can be corrected. In one embodiment, the process may initially recognize the toy construction model, identify a portion of the recognized toy construction model where an object code is expected, and feed a part image depicting the identified portion, e.g. the torso of a recognized figurine to the decoding function.

In step S6, in addition to determining the unlocked virtual object corresponding to the recognized toy construction model, the process may further identify a particular instance of the unlocked virtual object based on the detected object code. To this end, the process may maintain records associated with multiple instances of a particular virtual object, each instance being associated with a respective object code and, optionally with respective attributes, such as health, capabilities, etc.

Figures 8A, 8B, 8C:
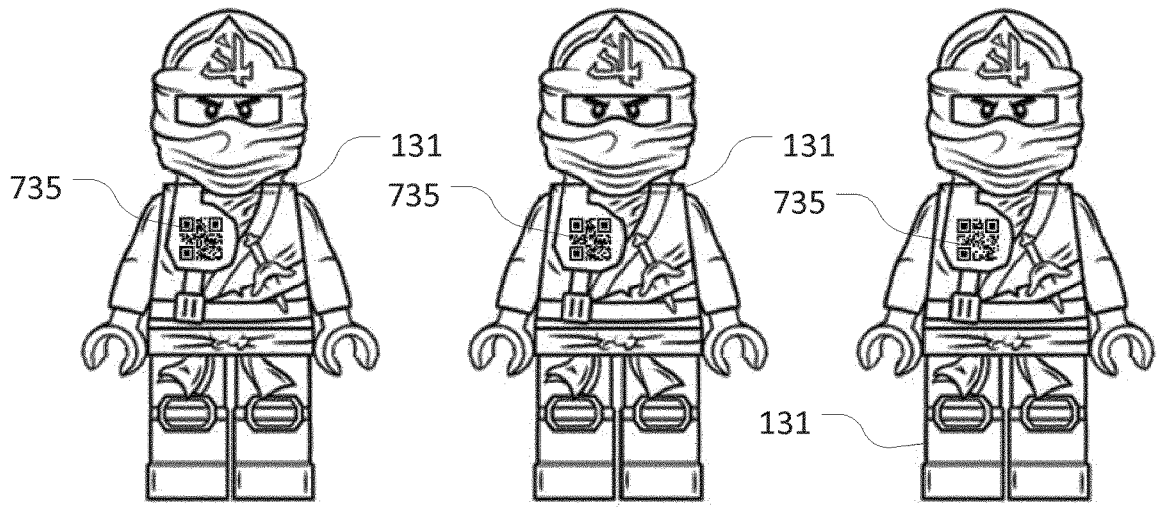
FIGS. 8A-C show examples of toy construction models for use with a toy system as described herein.

FIGS. 8A-C illustrate examples of toy construction models 131. The toy construction models of FIGS. 8A-C are figurines, each constructed from multiple toy construction elements, in particular toy construction elements forming the head, the torso, the legs, respectively, of the figurine. It will be appreciated that, alternatively, each figurine may be formed as a single toy construction element. It will also be appreciated that other toy construction models may represent other items, e.g. a vehicle, a building, an animal, etc. Each figurine has applied to it a computer-readable visual code 735 encoding a serial number or another form of identifier which may uniquely or non-uniquely identify a particular figurine. In the example of FIGS. 8A-C the visual code is printed on the torso of the figurine. However, in other examples the code may be applied to other parts of the model or even be encoded by visual markers applied to respective parts of the model. Hence, even though the figurines 131 of FIGS. 8A-C have identical shape, size and decoration apart from the code 735, a computing device having a code reader may distinguish them from each other. Accordingly, as the figurines of FIGS. 8A-C are perceptually very similar to the human observer (in some embodiments they may even be substantially indistinguishable), the end user will not easily notice the difference between two figurines. Moreover, embodiments of the process described herein may recognize the figurines as representing the same virtual object, in particular the same virtual character. However, a single unlock code may unlock all instances of the virtual object.

Figure 9:
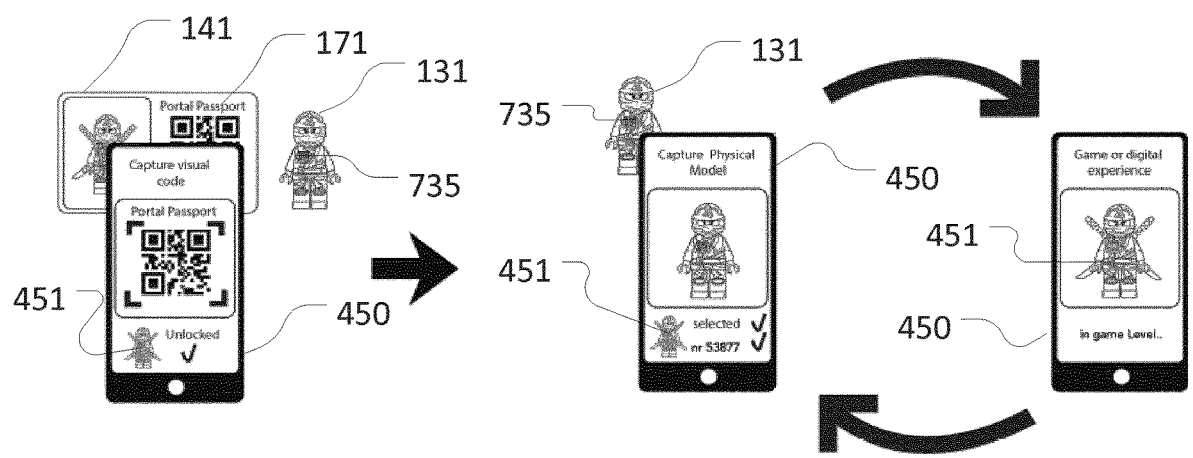
FIG. 9 schematically illustrates another example of a use of an embodiment of toy system described herein.

FIG. 9 illustrates an example of a use of the toy system described herein, e.g. including figurines as described in connection with FIGS. 8A-C and a suitably programmed portable device 450, e.g. a tablet or smartphone executing an app that implements a digital game of the toy system. As in the previous examples, the toy construction system includes toy construction elements (not explicitly shown) for constructing a figurine 131. The toy construction system further comprises a card 141 including an unlock code 171.

Initially, the processing device 450 reads the unlock code 171 included in the toy construction set, e.g. from card 141. This causes the corresponding virtual object 451 (in this example a virtual character) to be unlocked. The user may then capture an image of the figurine 131 carrying one of a set of object codes 735. The processing device recognises the figurine including the particular code 735 applied to the figurine. This causes the digital game executed by the processing device 450 to provide a play experience involving an instance of the virtual character 451. After completion of the play experience, the user may capture another image of the same or of a different figurine, in particular a figurine resembling figurine 131 but having a different object code 735 applied to it. This allows the user to engage in the same or a different play experience involving a different instance of the virtual character. Accordingly, the digital game may store or otherwise maintain game progress (such as health levels, capability levels, or other progress) for respective instances of a virtual character. For example, if two users each have their own figurine with respective object codes, they may both use the processing device 450 to engage in the digital game using respective instances of the same virtual character, in particular where the virtual character has respective in-game progress.

Figure 10:
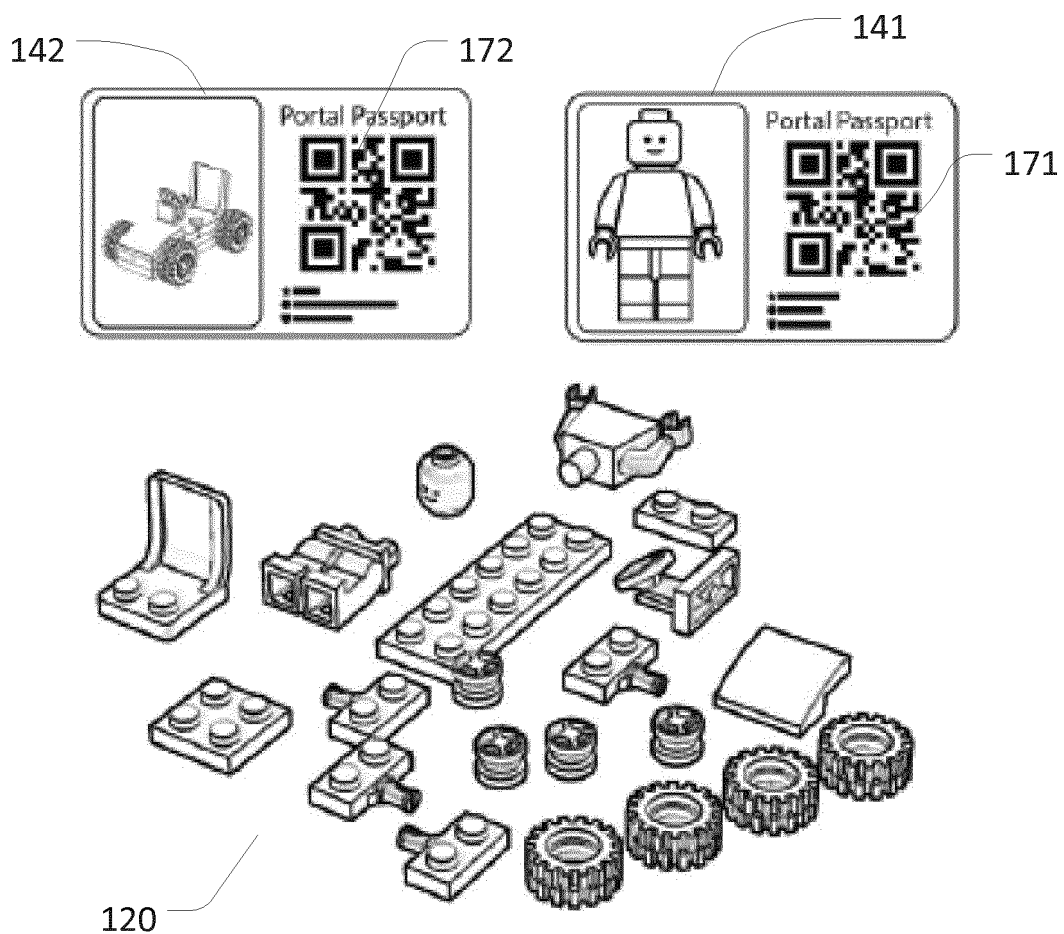
FIGS. 10-11 schematically illustrate examples of a toy system described herein.
Figure 10:
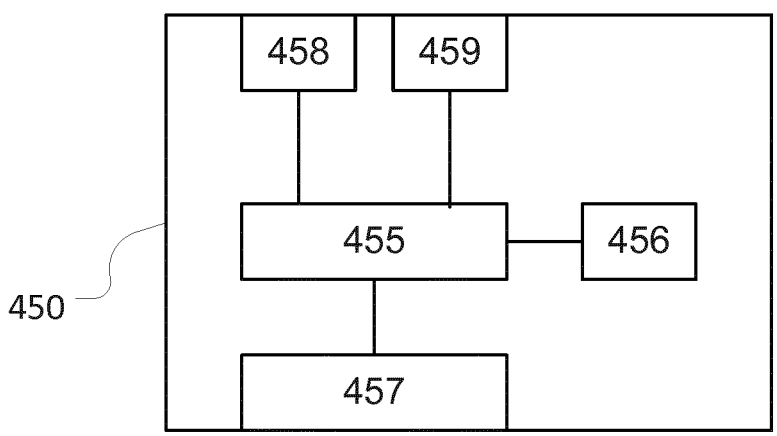

FIG. 10 schematically illustrates an example of a toy system described herein. The toy system includes a plurality of toy construction elements 120 from which one or more toy construction models can be constructed, e.g. as described in connection with FIG. 1. The toy system further comprises two cards 141, 142, e.g. made from plastic or cardboard. Each card shows an image or other representation of one of the toy construction models and a machine-readable code 171, 172, in this example a QR code, which represents an unlock code for a virtual object associated with the respective toy construction model, e.g. a virtual character and a virtual car, respectively. Alternatively, the unlock code(s) may be provided to the user in a different manner, e.g. by mail or sold separately. Hence, each unlock code is a unique code that comes with the product or is given to the user through a physical printed code or a digital code. The unlock code(s) when used (scanned or typed in) then unlocks the possibility of using computer vision to select the object in/for a digital experience.

The toy system further comprises a suitably programmed processing device 450, e.g. a tablet or smartphone or other portable computing device executing an app that implements a digital game of the toy system. The processing device 450 comprises a central processing unit 455, a memory 456, a user interface 457, a code reader 458 and an image capture device 459.

The user interface 457 may e.g. include a display, such as a touch screen, and, optionally input devices such as buttons, a touch pad, a pointing device, etc.

The image capture device 459, may include a digital camera, a depth camera, a stereo camera, and/or the like.

The code reader 458 may be a barcode reader, and RFID reader or the like. In some embodiments, the code reader may include a digital camera. In some embodiments, the code reader and the image capture device may be a single device. For example, the same digital camera may be used to read the unlock codes and capture images of the toy construction models.

Figure 11:
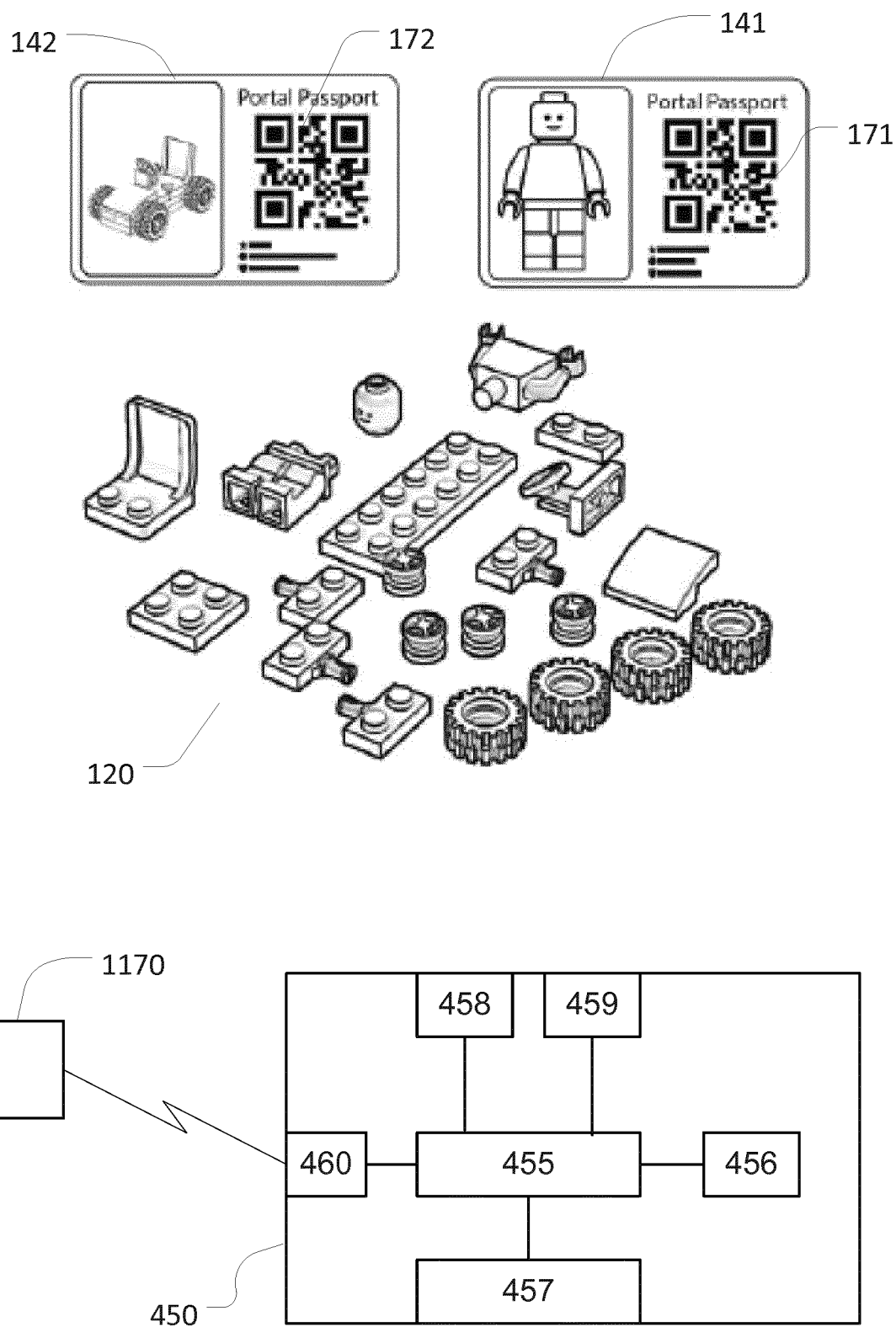

FIG. 11 schematically illustrates another example of a toy system described herein. The toy system of FIG. 11 is similar to the toy system of FIG. 10, the only difference being that the processing device 450 further comprises a communications interface 460, such as a wireless or wired communications interface allowing the processing device 450 to communicate with a remote system 1170. The communication may be wired or wireless. The communication may be via a communication network. The remote system may be a server computer or other suitable data processing system which may be configured to implement one or more of the processing steps described herein. For example, the remote system may maintain a database of unlock codes in order to determine whether a given unlock code has previously been used to unlock a virtual object. Alternatively or additionally, the remote system may maintain a database of object codes. Yet alternatively or additionally, the remote system may implement an object recognition process or parts thereof for recognizing toy construction models in captured images. Yet alternatively or additionally, the remote system may implement at least a part of the digital game, e.g. in embodiments where the digital game includes a multi-player play experience or a networked play experience.

Hence, generally, a virtual object needs to be unlocked only once by the unique unlock code. The selection of the virtual object (or of multiple/composite virtual objects at one time) can be done every time the virtual object is to be used in the digital experience or for a one-time use.

Although the invention has been described with reference to certain specific embodiments, various modifications thereof will be apparent to those skilled in art without departing from the spirit and scope of the invention as outlined in claims appended hereto.

The invention claimed is:

1. A toy system, comprising: a plurality of toy construction elements, an image capturing device and a processor, wherein the image capturing device is operable to capture one or more images of a toy construction model constructed from the toy construction elements; wherein the processor is configured to:
   execute a digital game, the digital game comprising computer executable code configured to cause the processor to provide a digital play experience;
   receive an unlock code indicative of one or more virtual objects;
   responsive to receiving the unlock code, unlock the one or more virtual objects associated with said received unlock code for use in the digital play experience, each virtual object being associated with a respective one of said toy construction elements or with a respective toy construction model constructed from the toy construction elements;
   receive one or more images captured by said image capturing device;
   recognize one or more toy construction elements or toy construction models within the one or more images, separate from and after unlocking the one or more virtual objects; and
   responsive to recognizing a first toy construction element or a first toy construction model associated with a first one of the unlocked virtual objects, provide a digital play experience involving said first unlocked virtual object.

2. A toy system according to claim 1, wherein the unlock code is provided as a physical item carrying a machine-readable or human-readable code.

3. A toy system according to claim 1, wherein the unlock code is of limited-use and wherein the processor is configured to determine whether the received unlock code has previously been used beyond the limited use, and to unlock the virtual object only, if the code has not previously been used beyond the limited use.

4. A toy system according to claim 1, wherein the digital game comprises computer executable code configured to cause the processor to control at least one virtual game item.

5. A toy system according to claim 1, wherein the unlocked first virtual object has a visual appearance that resembles the first toy construction element or model with which the first virtual object is associated.

6. A toy system according to claim 1, wherein the processor is configured, responsive to receiving the unlock code, to associate a visual appearance to the unlocked virtual object, in particular by receiving one or more captured images of a toy construction model whose visual appearance is to be associated with the unlocked virtual object; and to associate the visual appearance of said toy construction model with the unlocked virtual object.

7. A toy system according to claim 1, wherein the received one or more images, within which the processor recognizes one or more toy construction elements or toy construction models, depicts a composite toy construction model constructed from at least a first toy construction model and a second toy construction model; wherein recognizing one or more toy construction elements or toy construction models within the one or more images comprises recognizing each of the first and second toy construction models included in the composite toy construction model; and wherein the processor is configured, responsive to recognizing the first and second toy construction models, to provide a digital play experience involving said first and second unlocked virtual objects, wherein the first toy construction model is associated with a first unlocked virtual object and the second toy construction model is associated with a second unlocked virtual object.

8. A toy system according to claim 7, wherein the processor is configured to further recognize a spatial configuration of the first and second toy construction models relative to each other, and to modify the provided play experience responsive to the recognized spatial configuration.

9. A toy system according to claim 1, wherein one or more of the plurality of toy construction elements may include a visually recognizable code identifying a toy construction element or a toy construction model.

10. A toy system according to claim 9, wherein the plurality of toy construction elements includes one or more marker toy construction elements each having a visual appearance representative of an object code or a part thereof.

11. A toy system according to claim 10, wherein the processor is configured to detect the object code within the one or more images and to adapt the digital play experience responsive to the detected object code.

12. A toy system according to claim 1, wherein recognizing the first toy construction element or the first toy construction model associated with the first unlocked virtual object comprises:
  recognizing the first toy construction element as a toy construction element of a first type of toy construction elements or recognizing the first toy construction model as a toy construction model of a first type of toy construction models; and
  detecting a first object code associated with the recognized first toy construction element or the recognized first toy construction model.

13. A toy system according to claim 12, wherein the processor is configured, responsive to recognizing the first toy construction element or the first toy construction model, to provide a digital play experience involving a first instance of a plurality of instances of said first unlocked virtual object, the first virtual object being associated with the first type of toy construction element or the first type of toy construction model, and each of the plurality of instances of said virtual object being further associated with a respective object code.

14. A toy system according to claim 13, wherein the processor is configured, responsive to recognizing the first toy construction element or the first toy construction model associated with a first one of the unlocked virtual objects, to store the detected first object code associated with the first unlocked virtual object.

15. A toy system according to claim 14, wherein the processor is configured to determine whether an object code has previously been stored associated with the first unlocked virtual object and to associate the detected first object code with the first unlocked virtual object only if no object code has previously been associated with the first unlocked virtual object.

16. A toy system according to claim 15, wherein the processor is configured to compare the detected first object code with a previously stored object code associated with the first unlocked virtual object, and to provide the digital play experience involving said first unlocked virtual object only if the detected first object code corresponds to the previously stored object code associated with the first unlocked virtual object.

17. A method, implemented by a processor, of operating a toy system, the toy system comprising a plurality of toy construction elements, an image capturing device, and the processor, the image capturing device being operable to capture one or more images of one or more toy construction models constructed from the toy construction elements and placed within a field of view of the image capturing device, the method comprising:
  executing a digital game, the digital game comprising computer executable code configured to cause the processor to provide a digital play experience;
  receiving an unlock code indicative of one or more virtual objects;
  responsive to receiving the unlock code, unlocking the one or more virtual objects associated with said received unlock code for use in the digital play experience, each virtual object being associated with a respective one of said toy construction elements or with a respective toy construction model constructed from the toy construction elements;
  receiving one or more images captured by said image capturing device;
  recognizing one or more toy construction elements or toy construction models within the one or more images, separate from and after unlocking the one or more virtual objects; and
  responsive to recognizing a first toy construction element or a first toy construction model associated with a first one of the unlocked virtual objects, providing a digital play experience involving said first unlocked virtual object.

* * * * *